United States Patent [19]

Sullivan

[11] Patent Number: 5,101,220
[45] Date of Patent: Mar. 31, 1992

[54] CHART RECORDER WITH THERMAL PRINT HEAD AND SOUND GENERATOR

[75] Inventor: Michael J. Sullivan, Portsmouth, R.I.

[73] Assignee: Astro-Med, Inc., West Warwick, R.I.

[21] Appl. No.: 502,085

[22] Filed: Mar. 29, 1990

[51] Int. Cl.⁵ .............................................. G01D 9/00
[52] U.S. Cl. ................... 346/17; 346/76 PH; 340/384 E
[58] Field of Search ............... 346/25, 17, 76 R, 141, 346/76 PH, 65; 340/384 E

[56] References Cited

U.S. PATENT DOCUMENTS

| | | | |
|---|---|---|---|
| 3,277,245 | 10/1966 | Sponga | 346/35 |
| 3,571,786 | 3/1971 | Saling | 346/33 |
| 3,971,041 | 7/1976 | Mason | 346/76 R |
| 4,085,407 | 4/1978 | Stratbucker et al. | 346/76 R |
| 4,214,590 | 7/1980 | Patnoi et al. | 128/710 |
| 4,215,351 | 7/1980 | Lowe | 346/136 |
| 4,576,178 | 3/1986 | Johnson | 128/701 |

Primary Examiner—Benjamin R. Fuller
Assistant Examiner—Nancy Le
Attorney, Agent, or Firm—Salter & Michaelson

[57] ABSTRACT

A thermal chart recorder which is operative for simultaneously generating a plurality of wave form images on a thermally responsive chart in response to input signals utilizing a stationary thermal print head, includes a sound generation circuit for generating audible sounds which simulate the sounds generated by the styli of a traditional stylus-type recorder. The volume levels of the sound produced by the sound generation circuit correspond to the sum of the approximate absolute values of the rates of change of the input signals and can be utilized for alerting operators to rapid changes in recorded parameters.

9 Claims, 3 Drawing Sheets

CHART RECORDER WITH THERMAL PRINT HEAD AND SOUND GENERATOR

BACKGROUND AND SUMMARY OF THE INVENTION

The instant invention relates to chart recorders and more particularly to a thermal chart recorder of the general type which is operative for generating wave form images on a moving chart in response to input signals without the use of moving styli.

Thermal chart recorders which utilize stationary thermal print heads for applying images to thermally sensitive paper charts have generally been found to be highly effective for recording many types of data. In this regard, it has been found that thermal chart recorders are generally capable of generating high resolution wave form images and that because they include a minimum of moving parts they are generally less prone to mechanical failures than other types of chart recorders, such as those which utilize moving styli for applying markings to charts. As a result, thermal chart recorders have replaced conventional moving stylus type recorders in many applications.

In addition to being capable of operating with relatively high levels of efficiency and accuracy, it has been found that most thermal chart recorders are operative for producing markings on charts with substantially less audible noise than traditional stylus type recorders. This is because thermal chart recorders are operative without the use of moving styli which inherently produce scratching sounds as they pass over the surfaces of charts to produce markings thereon. However, while in most instances this feature has been found to be an advantage of thermal chart recorders over stylus-type recorders, it has been found that in certain specific instances it can be a disadvantage. In this connection, it as been found that in some instances operators who have become accustomed to monitoring conventional stylus type chart recorders have learned to rely on the scratching sounds produced by the styli thereof to alert them to significant rapid changes in recorded parameters. As a result, it has been found that in some situations when stylus type recorders have been replaced by thermal recorders the operators thereof have objected to the lack of stylus sounds to alert them to changes in recorded parameters. Accordingly, despite the many advantages of thermal chart recorders, in some situations it has been found that operators have prefered conventional stylus type recorders over thermal recorders.

The instant invention provides a thermal chart recorder which overcomes the above disadvantages of the previously available thermal chart recorders. Specifically, the instant invention provides a thermal chart recorder including means for generating audible sounds which simulate the sounds generated by the moving styli of a stylus type chart recorder. More specifically, the instant invention provides a chart recorder of the general type which is operative for generating wave form images in response to input signals without the use of moving styli. However, in contrast to the previously available chart recorders of this general type, the chart recorder of the instant invention comprises means which is operative for generating audible sound having a volume level which corresponds to the approximate instantaneous absolute value of the rate of change of an input signal to the chart recorder. The chart recorder of the instant invention is preferably embodied as a thermal chart recorder which is responsive to a plurality of input signals for generating a plurality of wave form images and the means for generating audible sound is preferably operative for generating audible sound having a volume level which is proportional to the sum of the instantaneous absolute values of the rates of change of the input signals. Further, the means for generating audible sound is preferably operable for generating sound having a substantially uniform amplitude over a wide frequency range so that the sound generated is essentially white noise. The means for generating audible sound preferably includes means for determining the approximate instantaneous absolute derivative values of the input signals and means which is responsive to the sum of the instantaneous absolute derivative values for producing audible sound having a corresponding volume level. Still further, the means for generating audible sound preferably includes means for filtering the approximate instantaneous absolute derivative values of the input signals for producing filtered derivative signals, and the means for generating audible sound is preferably responsive to the sum of the absolute values of the filtered derivative signals for producing audible sound having a volume level which corresponds thereto.

It has been found that the chart recorder of the instant invention can be effectively utilized to replace traditional stylus-type recorders in applications where operators have become accustomed to relying on the audible sounds generated by the styli of such recorders. Specifically, it has been found that the sound generating means of the chart recorder of the instant invention is capable of producing sounds having volume levels which correspond to the volume levels of the sounds generated by the styli of a stylus type recorder and that as a result, the sound generating means of the chart recorder of the instant invention can be effectively utilized for alerting operators to significant changes in monitored parameters.

Accordingly, it is a primary object of the instant invention to provide a thermal chart recorder which includes means for generating sounds which simulate the sounds produced by the styli of a stylus type recorder.

Another object of the instant invention is to provide a thermal chart recorder which includes means for generating essentially white noise having a volume level which corresponds to the rate of change of one or more input signals to the chart recorder.

Another object of the instant invention is to provide a chart recorder which is operative for generating a plurality of wave form images corresponding to a plurality of input signals and which includes means for generating essentially white noise having a volume level corresponding to the sum of the approximate derivative values of the input signals.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
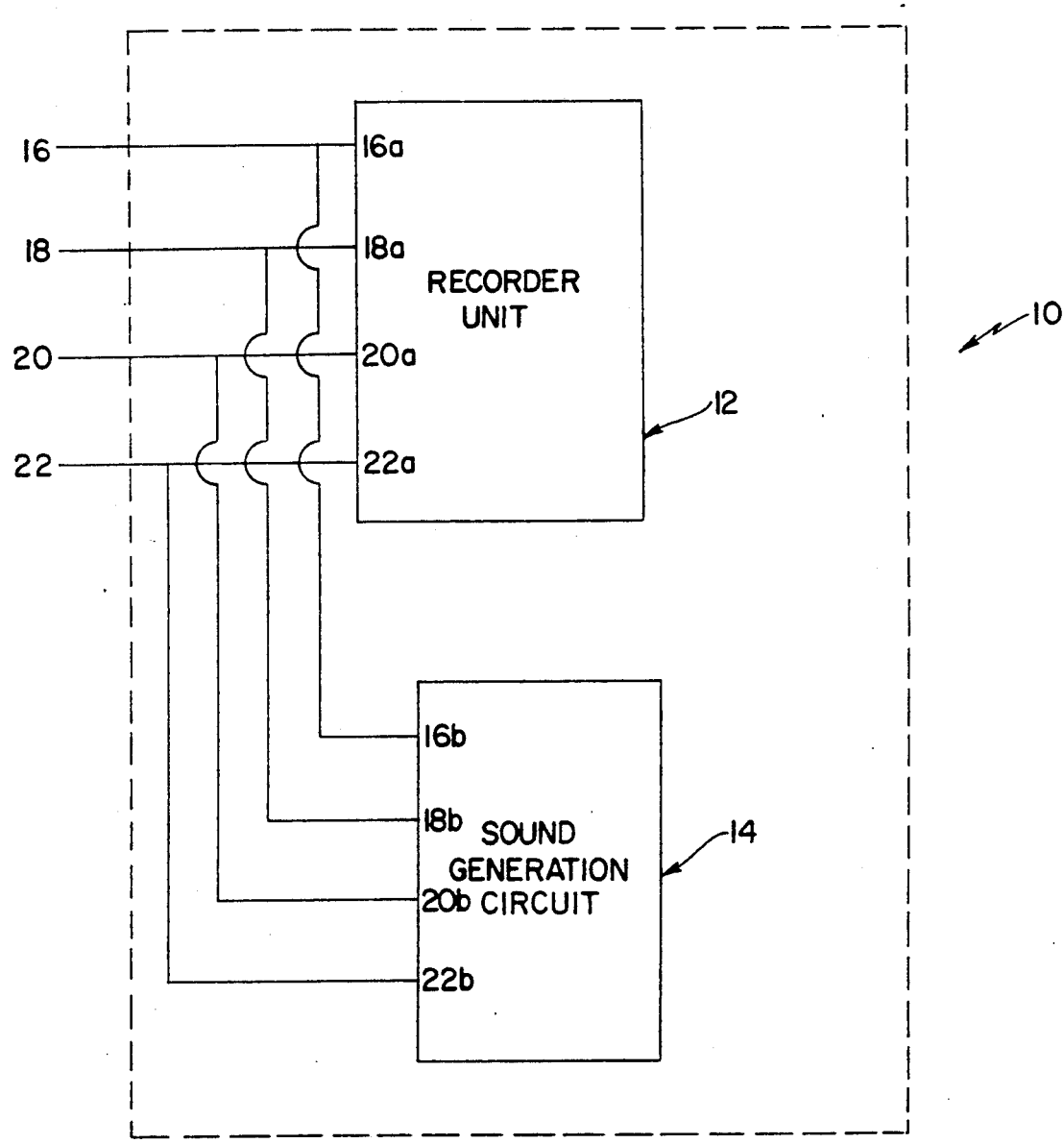
FIG. 1 is a schematic view of the chart recorder of the instant invention.

Referring now to the drawings, the chart recorder of the instant invention is illustrated in FIG. 1 and generally indicated at 10. The chart recorder 10 comprises a recorder unit generally indicated at 12 and a sound generation circuit generally indicated at 14. The recorder unit 12 is operative for receiving first, second, third and fourth input signals from first, second, third and fourth input leads 16, 18, 20 and 22, respectively, via first, second, third and fourth input terminals 16a, 18a, 20a and 22a, respectively, and the sound generation circuit 14 is simultaneously operative for receiving the same first, second, third and fourth input signals from the first, second, third and fourth input leads 16, 18, 20 and 22, respectively, via first, second, third and fourth input terminals 16b, 18b, 20b and 22b, respectively. The recorder unit 12 is preferably of conventional construction and it is operative for applying wave form images corresponding to the first, second, third and fourth input signals to a thermally responsive chart utilizing a stationary thermal print head. The sound generation circuit 14 is responsive to the same first, second, third and fourth input signals for generating sounds which simulate the sounds produced by the moving styli of a stylus type chart recorder as the styli are moved across the surface of a chart for applying wave form images thereto. Accordingly, while the chart recorder 10 is operative for generating wave form images on a chart without the use of one or more moving styli, it is nevertheless operative for generating sounds which are similar to those generated by a traditional stylus type chart recorder.

The recorder unit 12 as herein embodied comprises a thermal chart recorder comprising one or more stationary thermal print heads which are selectively energizable for applying wave form images to a thermally responsive chart. A chart recorder of this general type is disclosed in the U.S. Pat. No. to Sullivan et al, 4,739,344, although a wide variety of other thermal chart recorder units are well known to those having skill in the related art. In any event, because the recorder unit 12 is operative for applying images to a chart without the use of one or more moving styli, the recorder unit 12 is not normally operative for generating sounds of the type produced by the styli of a stylus type chart recorder as the styli thereof move across the surface of a moving chart to produce wave form images thereon.

Figure 2:
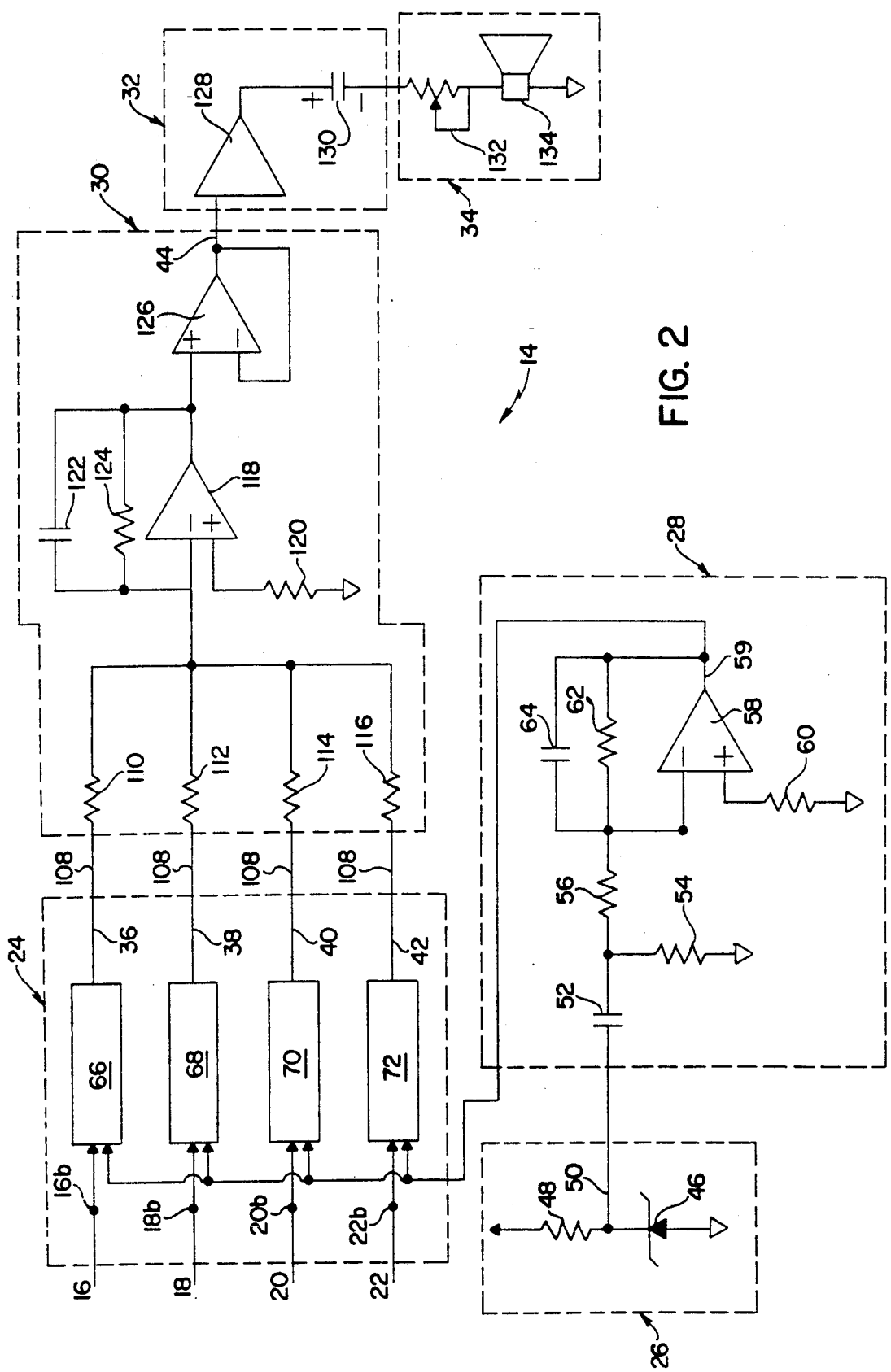
FIG. 2 is a schematic illustration of the sound generation circuit thereof.

The sound generation circuit 14 is responsive to the first, second, third and fourth input signals received through the first, second, third and fourth input terminals 16b, 18b, 20b and 22b, respectively, for generating sounds which simulate the sounds generated by first, second, third and fourth styli of a stylus type chart recorder. As illustrated in FIG. 2, the sound generation circuit 14 comprises a derivative subcircuit generally indicated at 24, a noise generation subcircuit generally indicated at 26, a band pass filter subcircuit generally indicated at 28, a summing subcircuit generally indicated at 30, a power amplifier subcircuit generally indicated at 32, and an output speaker subcircuit generally indicated at 34. During operation of the sound generation circuit 14, the noise generation subcircuit 26 is operative for generating a noise signal having a relatively wide frequency range and the band pass filter subcircuit 28 is operative for amplifying and selectively filtering the noise signal generated by the noise generation subcircuit 26 to produce a filtered noise signal. The derivative subcircuit 24 is operative for receiving the first, second, third and fourth input signals through the first, second, third and fourth input terminals 16b, 18b, 20b and 22b, respectively, and for producing derivative signals which correspond to the absolute derivative or rate of change values of the first, second, third and fourth input signals. The derivative subcircuit 24 is further operative for multiplying each of the derivative signals by the filtered noise signal from the band pass filter subcircuit 28 in order to produce first, second, third and fourth derivative noise signals in first, second, third and fourth derivative output lines 36, 38, 40 and 42, respectively. The summing subcircuit 30 is operative for receiving the first, second, third and fourth derivative noise signals and for summing these signals to produce a sum derivative noise signal in an output line 44. The amplifier subcircuit 32 is operative for amplifying the sum derivative noise signal from the summing subcircuit 30 and the speaker subcircuit 34 is operative for generating audible sound having a volume level which corresponds to the amplified signal from the amplifier subcircuit 32.

The noise generation subcircuit 26 comprises a zener diode 46, such as a Motorola IN4742, which is connected to the ground or negative terminal of a DC power supply and a load resister 48 which is connected between the positive terminal of the DC power supply and the zener diode 46 so that the zener diode 46 and the load resistor 48 are operative for producing a noise signal in an output line 50. The noise signal generated by the noise generation subcircuit 26 normally has a substantially uniform amplitude throughout a frequency range of between approximately 0 cycles per second and 200,000 cycles per second so that it is an essentially white noise signal.

The band pass filter subcircuit 28 is operative for amplifying and selectively filtering the noise signals from the noise generation subcircuit 26. The band pass filter subcircuit 28 includes a blocking capacitor 52 which is operative for filtering out the low frequency components of the noise signal generated by the noise generation subcircuit 26. The band pass filter subcircuit 28 further includes a resistor 54 which is connected between the output from the capacitor 52 and the ground terminal and a resistor 56 which is connected between the output from the capacitor 52 and the negative input terminal of an operational amplifier 58. The operational amplifier 58 comprises an operational amplifier such as an OP04 operational amplifier manufactured by Precision Monolithics of Santa Clara, Calif., and a resistor 60 is connected between ground and the positive terminal of the operational amplifier 58. The operational amplifier 58 has an output line 59 and a gain control resistor 62 is connected between the negative input to the operational amplifier 58 and the output line 59. A blocking capacitor 64 is connected between the negative input to the operational amplifier 58 and the output line 59 in parallel relation to the resistor 62 for filtering out the high frequency components of the noise signal from the noise generation subcircuit 26. Accordingly, the signal from the output line 59 of the operational amplifier 58 represents an amplified noise signal from which the highest and lowest frequency components have been filtered out.

Figure 3:
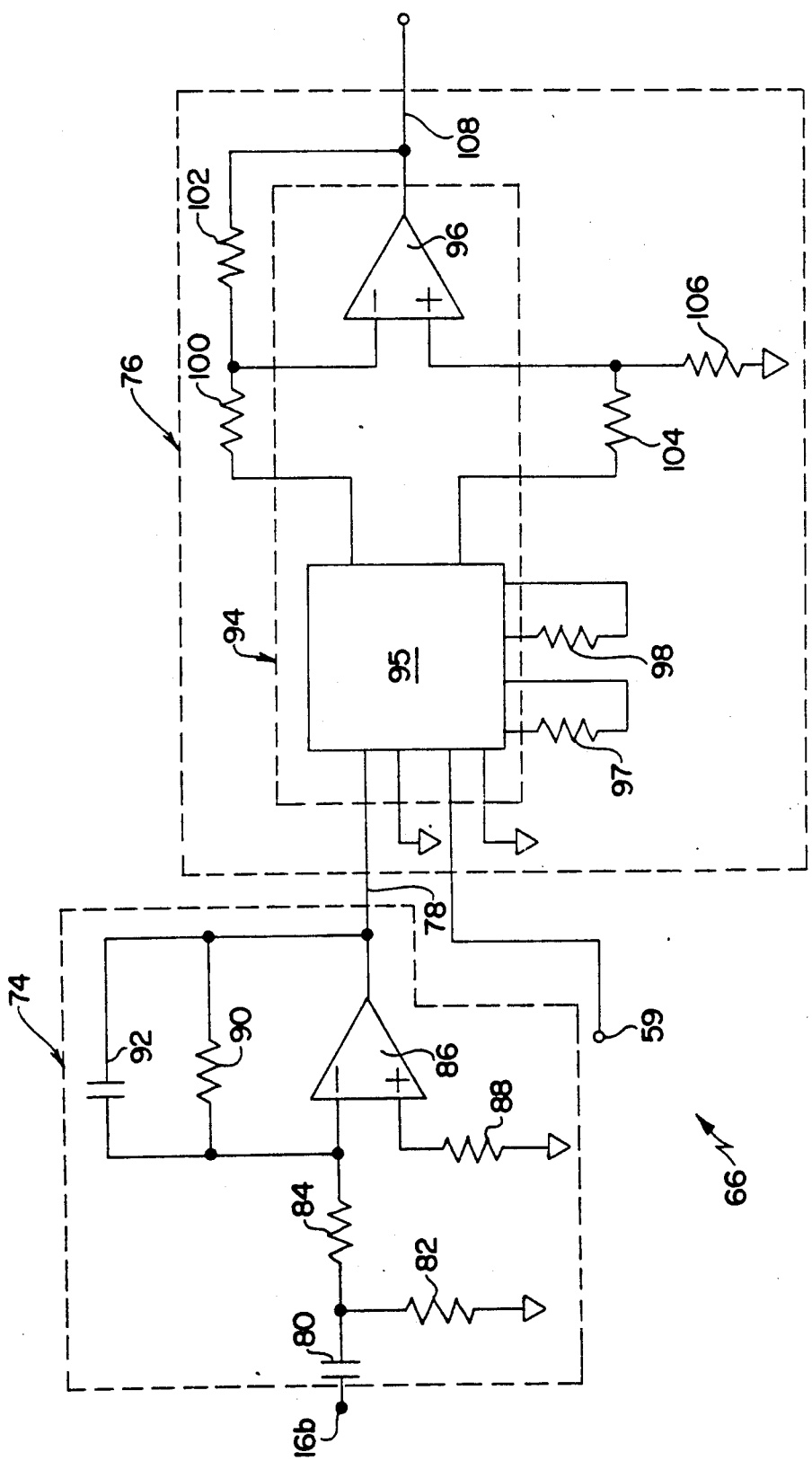
FIG. 3 is a schematic illustration of one of the derivative circuits of the sound generation circuit.

The derivative subcircuit 24 comprises identical first, second, third and fourth derivative circuits 66, 68, 70 and 72, respectively, the first of which is illustrated in FIG. 3. The first derivative circuit 66 comprises a band pass filter or derivative section generally indicated at 74 and an analog multiplier section generally indicated at 76. The band pass filter section 74 is operative for receiving the first input signal from the first input terminal 16b and for producing a derivative signal in an output line 78 having a value which approximates the absolute value of the derivative or instantaneous rate of change of the first input signal. The derivative section 74 comprises an input capacitor 80, a resistor 82 which is connected between the output from the input capacitor 80 and the ground terminal and an input resistor 84. The derivative section 74 further comprises an operational amplifier 86 which preferably comprises an OPO9 operational amplifier made by Precision Monolithics, Inc. The input resistor 84 is connected to the negative terminal of the operational amplifier 86 and a resistor 88 is connected between the ground terminal and the positive terminal of the operational amplifier 86. A feedback capacitor 92 and a feedback resistor 90 are connected in parallel between the negative input to the operational amplifier 86 and the output thereof and the output line 78 is connected to the output terminal of the operational amplifier 86. The analog multiplier section 76 is connected to the output line 78 from the derivative section 74 and to the noise output 59 from the band pass filter subcircuit 28 and it includes an analog multiplier 94 with associated resistors for controlling gain. The analog multiplier 94 preferably comprises a XR2228 analog multiplier made by Exar, Inc. of Sunnyvale, Calif. which includes a multiplier 95 and an operational amplifier 96. The analog multiplier section 76 includes gain resistors 97 and 98 which control the gain values applied to the noise signal from the output line 59 of the band pass filter subcircuit 28 and the derivative signal from the output line 78 from the derivative section 74, respectively, by the multiplier section 76. The multiplier section 76 further includes resistors 100, 102, 104 and 106 which are connected as illustrated to achieve the desired overall gain multiplication from the multiplier section 76 in a conventional manner. The output from the analog multiplier 94 is connected to an output line 108 for conducting a resulting output signal from the analog multiplier section 76 which corresponds to the product of the absolute derivative signal from the output line 78 of the derivative section 74 multiplied by the gain provided by the resistor 98, the noise signal in the output line 59 from the derivative section 74, the gain provided by the resistor 97, and the overall gain provided by the resistors 100, 102, 104 and 106.

The output lines 108 of the derivative circuits 66, 68, 70 and 72 are connected to resistors 110, 112, 114 and 116, respectively, of the summing subcircuit 36. The combined outputs from the resistors 110, 112, 114 and 116 are connected to the negative terminal of an operational amplifier 118 which also preferably comprises an OPO9 operation amplifier made by Precision Monolithics, Inc. A resistor 120 is connected between the positive input terminal of the operational amplifier 118 and the ground terminal and a feedback capacitor 122 and a feedback resistor 124 are connected in parallel between the negative input terminal of the operational amplifier 118 and the output terminal thereof. The positive terminal of a buffer 126 which preferably also comprises an OPO9 operational amplifier is connected to the output from the operational amplifier 118 and the negative terminal of the buffer 126 is connected to the output line 44 which extends from the output terminal of the buffer 126.

The power amplifier subcircuit 32 comprises a power amplifier 128 and a filter capacitor 130. The power amplifier 128 preferably comprises a LM3809 power amplifier manufactured by National Semiconductor Corporation of Santa Clara, Calif. and the capacitor 130 is connected to the output from the amplifier 128 for filtering the amplified output signal therefrom.

The speaker subcircuit 34 is connected to the output from the filter capacitor 130 of the power amplifier subcircuit 32 and it is operative for generating audible sound in response thereto. The speaker subcircuit 34 comprises a potentiometer 132 and a speaker 134. The potentiometer 132 is connected to the output from the capacitor 130 and the speaker 134 is connected between the output from the potentiometer 132 and the ground terminal. Accordingly, the speaker 134 is operative for producing audible sound in response to the signal from the power amplifier subcircuit 32 and the potentiometer 132 is operative for controlling the volume of the sound produced by the speaker 134.

Accordingly, during use and operation of the sound generation circuit 14, the zener diode 46 is operative for generating an essentially white noise signal which is selectively filtered and amplified by the band pass filter subcircuit 28. The derivative sections 74 of the derivative subcircuit 24 are operative for producing signals which correspond to the absolute derivative or instantaneous rate of change values of the input signals from the input terminals 16b, 18b, 20b and 22b and the analog multiplier sections 76 are operative for individually multiplying the absolute derivative values from the derivative subcircuit 24 by the noise signal from the band pass filter circuit 28 and by predetermined gain values to produce derivative noise signals in the output lines 108. The derivative noise signals are combined in the summing amplifier subcircuit 30 and the output from the summing amplifier subcircuit 30 is then amplified in the power amplifier subcircuit 32 and passed to the speaker subcircuit 34 for producing audible sound. Because the sound which is produced from the speaker subcircuit 34 has a relatively broad frequency range it is an essentially white noise signal and it corresponds to the general type of sound normally produced from the styli of a stylus-type recorder as the styli pass over the surface of a chart. Further, since the volume of the sound produced by the speaker subcircuit 34 corresponds to the sum of the rates of change of the input signals at the input terminals 16b, 18b, 20b, and 22b the sounds produced by the speaker subcircuit 34 closely approximate the overall sounds produced by the styli of a stylus-type recorder which inherently increase in volume as the speed of stylus movement is increased.

It is seen therefore that the instant invention provides an effective chart recorder which is operative without a moving styli for producing wave form images, but which is nevertheless operative for generating sounds which simulate the sounds produced by the styli of a stylus-type recorder. Accordingly, the chart recorder of the instant invention can be effectively utilized in applications where operators have become accustomed to relying on the sounds generated by moving styli to indicate changes in recorded parameters. Accordingly, the instant invention represents a significant advancement in the art relating to chart recorders which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a chart recorder which is operative for generating a wave form image on a chart in response to an input signal, said input signal having a rate of change having an instantaneous absolute value, said chart recorder being operative without a moving stylus for applying markings to said chart, the improvement comprising means operative without contacting said chart for electronically generating audible sound having a volume level corresponding to an approximate instantaneous absolute value of the rate of change of said input signal.

2. The chart recorder of claim 1, further characterized as a thermal chart recorder including a thermal print head which is operative for applying markings to a thermally responsive chart.

3. In the chart recorder of claim 1, said means for generating audible sound further characterized as being operative for generating audible sound having a volume level which corresponds approximately proportionately to the instantaneous absolute value of the rate of change of said input signal.

4. In the chart recorder of claim 1, said means for generating audible sound including means for determining an approximate instantaneous absolute derivative value of said input signal and means responsive to said approximate instantaneous absolute derivative value for producing audible sound having a volume level which corresponds thereto.

5. The chart recorder of claim 1, further characterized as being operative for simultaneously generating a plurality of separate wave form images on a chart in response to a plurality of separate input signals without moving styli, each of said input signals having a rate of change having an absolute value, said means for generating audible sound further characterized as being operative for generating audible sound having a volume level corresponding to a sum of the approximate instantaneous absolute values of the rates of change of said input signals.

6. In the chart recorder of claim 1, said means for generating audible sound including means for determining an approximate instantaneous absolute derivative value of said input signal, means for filtering the approximate instantaneous absolute derivative value of said input signal for producing a filtered derivative signal and means responsive to said filtered derivative signal for producing audible sound having a volume level which corresponds thereto.

7. The chart recorder of claim 6, further characterized as being operative for simultaneously generating a plurality of separate wave form images on a chart in response to a plurality of separate input signals for applying markings to said chart without moving styli, said means for generating audible sound comprising means for simultaneously determining the approximate instantaneous absolute derivative values of said input signals, means for simultaneously filtering the instantaneous absolute derivative values of said input signals for producing filtered derivative signals, means for summing the instantaneous values of said filtered derivative signals for producing an instantaneous sum of said filtered derivative signals and means responsive to the instantaneous sum of said filtered derivative signals for producing audible sound having a volume level corresponding thereto.

8. In the chart recorder of claim 1, said means for generating audible sound further characterized as being operative for generating essentially white noise audible sound.

9. In a non stylus-type chart recorder which is operative for generating a wave form image on a chart in response to an input signal, said non stylus-type chart recorder being operative without a moving stylus for applying markings to said chart, the improvement comprising means operative without contacting said chart for electronically generating an audible sound pattern which simulates a pattern sound generated by a stylus of a stylus-type chart recorder as the stylus of said stylus-type chart recorder contacts a moving chart for simultaneously generating a wave form image in response to said input signal.

* * * * *